United States Patent
Tsotsis

[19]

[11] Patent Number: 6,074,716
[45] Date of Patent: Jun. 13, 2000

[54] WEAVABLE METAL MATRIX IMPREGNATED TOW COMPOSITE MATERIAL

[75] Inventor: Thomas K. Tsotsis, Orange, Calif.

[73] Assignee: McDonnell Douglas Corporation, Hazelwood, Mich.

[21] Appl. No.: 08/872,294

[22] Filed: Jun. 10, 1997

Related U.S. Application Data

[60] Provisional application No. 60/019,538, Jun. 10, 1996.

[51] Int. Cl.[7] .............................. B32B 1/08; B32B 15/08
[52] U.S. Cl. ......................... 428/35.7; 428/74; 428/283; 428/35.8; 428/567
[58] Field of Search ................................. 428/35.7, 35.8, 428/549, 567, 570, 577, 608, 36.3, 195, 208, 218, 240, 245, 457, 408, 74, 34.5, 35.3, 36.1, 373, 372, 379, 389, 367, 392, 394, 283

[56] References Cited

U.S. PATENT DOCUMENTS

| | | | |
|---|---|---|---|
| 4,772,502 | 9/1988 | Okura et al. ............................. | 428/74 |
| 4,902,453 | 2/1990 | Okura et al. ............................. | 264/29.2 |
| 5,053,275 | 10/1991 | Kagechi et al. ......................... | 428/372 |
| 5,082,701 | 1/1992 | Craven et al. .......................... | 428/34.5 |
| 5,206,085 | 4/1993 | Nakagawa et al. ...................... | 428/372 |
| 5,275,883 | 1/1994 | Leone et al. ............................ | 428/373 |
| 5,643,990 | 7/1997 | Uehara et al. .......................... | 524/496 |
| 5,824,410 | 10/1998 | Sakai et al. ............................ | 428/361 |

FOREIGN PATENT DOCUMENTS 56-119746  9/1981  Japan .

*Primary Examiner*—Deborah Jones
*Assistant Examiner*—Michael LaVilla
*Attorney, Agent, or Firm*—Brooks & Kushman P.C.

[57] ABSTRACT

A composite material comprising a flexible jacket covering a roving of fibers which have been impregnated with a metal powder is described. The flexible jacket allows the material to be handled easily and to be weaved, knitted or braided into the shape or form desired. The jacket is made from a thermoplastic which decomposes or is otherwise fugitive during the processing of the woven form in which the metal is melted to consolidate the form into a finished part.

18 Claims, 1 Drawing Sheet

WEAVABLE METAL MATRIX IMPREGNATED TOW COMPOSITE MATERIAL

This application claims the benefit of U.S. Provisional Application No. 60/019,538, filed on Jun. 10, 1996.

TECHNICAL FIELD

The present invention is directed to a novel weavable metal matrix impregnated tow composite material. More specifically, it pertains to a composite material comprising a flexible thermoplastic jacket covering a bundle of fibers which have been impregnated with a metal powder. The jacket is selected from a thermoplastic material which decomposes during processing of the metal matrix impregnated tow composite material to form the finished part.

BACKGROUND ART

Traditional metal matrix composite materials are known to be extremely difficult to handle and to process into finished parts. For example, flat sheets employing a thermoplastic binder to hold the metal powders in place during handling have been used to ultimately allow suitable processing into the finished product. Alternative means such as liquid molding into preforms have been used. Also, injection molding techniques may be used for complex-shaped parts in which reinforcements are in the form of chopped whiskers, but are not useful for continuous fibers without suitable preforms. Unfortunately, these known techniques require great effort and added expense, thereby making such metal matrix materials commercially unattractive for widespread adoption in industrial applications. The present invention avoids these difficulties by providing a material which is both easy to handle and easy to form into complex shapes by weaving, knitting or braiding. The instant invention allows the use of continuous fibers, the formation of net-shape parts without the use of a preform and with the metal already distributed throughout the part without having to infiltrate a pre-existing form, and shaping of the part at room temperature with higher temperatures being necessary only at the time of consolidation into the finished part.

Metal matrix composites are typically made from low density metals such as aluminum, titanium, or magnesium which are reinforced with high strength and stiffness fibers such as boron or silicon carbide or with whiskers of materials such as aluminum oxide, boron carbide or silicon carbide. As with polymer matrix composites, physical properties are maximized when continuous fibers, instead of chopped or whisker fibers, are used in the reinforcement. Because of the high temperatures needed in the processing of metals, metal matrix composites are normally not processed in the same manner as polymer matrix composites, except as in the manner described herein in accordance with the instant invention.

A process for making thermoplastic sheathed thermoplastic powder-impregnated fiber roving (i.e., a polymer matrix composite material) is described in U.S. Pat. No. 4,614,678. This patent describes a process whereby fiber rovings or tows are passed through a fluidized bed of thermoplastic powder wherein electrostatic charges cause the thermoplastic powder to adhere to the fibers. Subsequently, the roving is extruded or dip-coated with a solution or dispersion to provide a continuous thermoplastic outer sheath. However, such a thermoplastic powder-impregnated fiber material has relatively low mechanical and thermal properties as compared to a metal matrix composite material in accordance with the present invention. Moreover, the polymer contained in the sheath becomes integrated into the final structure.

Metal matrix composites have several performance advantages over polymer matrix composite materials. Metals generally have higher mechanical and thermal properties than polymers. Further, metals are typically tougher (i.e., a higher fracture toughness) than thermoplastic resins. While a lower density is usually associated with polymer matrix composites, these materials may not be capable of withstanding extreme environmental conditions (high heat, humidity) as can metal matrix composite materials. Metal matrix composites are thus preferred in high temperature applications including, but not limited to, jet engine fan blades, satellite structures, or engine components. Metal matrix composites are also preferred over polymer matrix composites where the material is exposed to organic solvents which would swell or dissolve a polymer matrix material.

Primarily due to differences in thermal properties, it is generally not considered practical to combine polymers along with metals into the same composite form, especially where continuous fibers and/or continuous metal phases are desired. Surprisingly, the instant invention overcomes such limitations on metal/polymer combinations in the manner set forth hereinbelow.

Further, the instant invention allows for protection of the metal impregnated fiber bundle by the jacket surrounding said assembly. In weaving, knitting or braiding operations, considerable potential exists for the fiber bundles to become damaged due to wear and abrasion, particularly where complex shapes are involved. The jacket protects the fiber bundles from such wear and abrasion.

DISCLOSURE OF THE INVENTION

Accordingly, it is an object of the present invention to overcome the difficulties of known metal-matrix composites by providing a novel weavable metal matrix impregnated tow composite material which is commercially attractive for industrial production and relatively easy to handle and to form into complex shapes. The material in accordance with the present invention may be knitted or braided if appropriately manufactured.

This invention pertains to a weavable composite material comprising a flexible thermoplastic jacket covering a bundle of fibers which have been impregnated with a metal powder. The jacket is selected from a thermoplastic material which decomposes during final consolidation processing of the metal matrix impregnated tow composite material to form the finished part.

While an embodiment of this invention is illustrated and disclosed, this embodiment should not be construed to limit the claims. It is anticipated that various modifications and alternative designs may be made without departing from the scope of this invention.

BEST MODE FOR CARRYING OUT THE INVENTION

Figure 1:
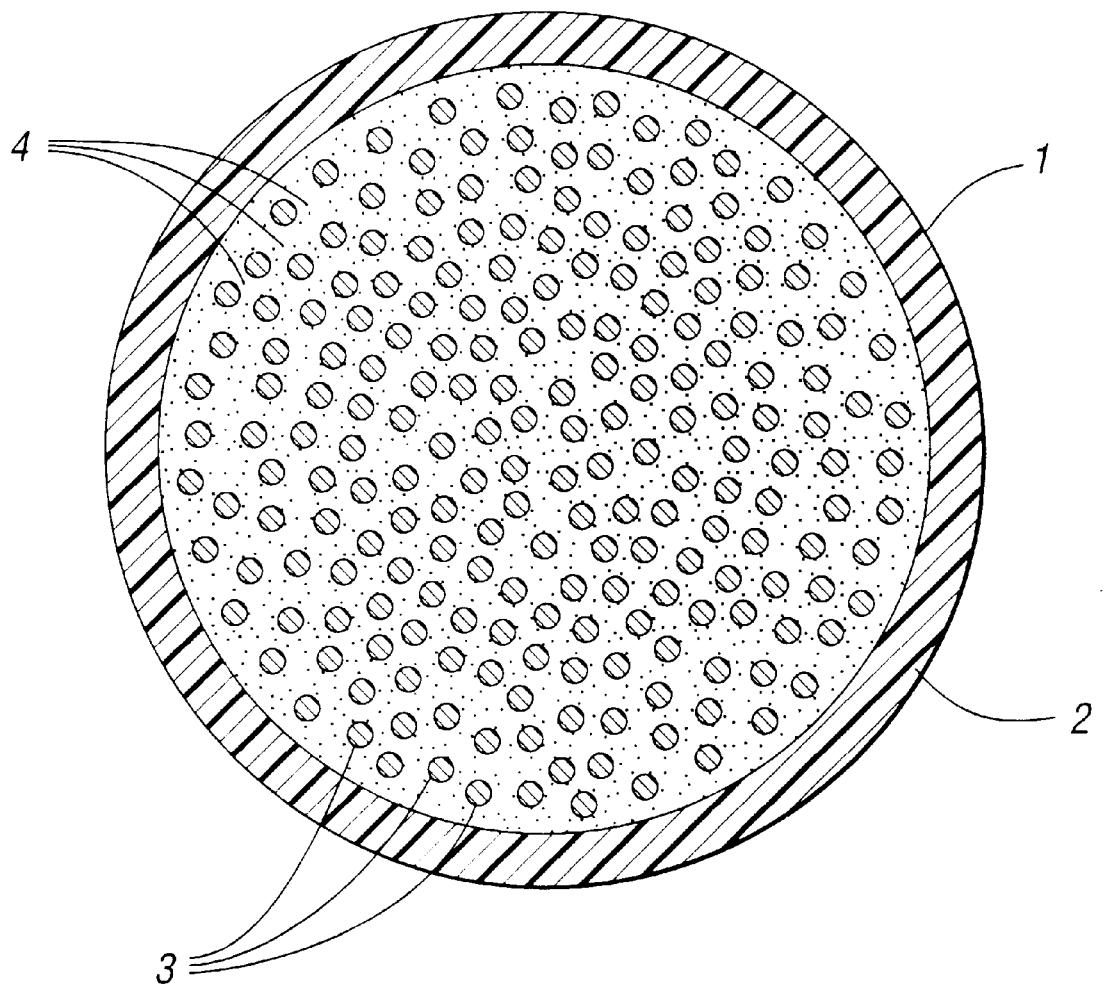
FIG. 1 illustrates a cross-section of a weavable composite made in accordance with the instant invention.

The present invention pertains to a weavable metal matrix impregnated tow composite material, as seen in FIG. 1. The composite material 1 of FIG. 1 comprises a flexible jacket 2 covering a roving of fibers 3 impregnated with metal powder 4.

The reinforcing fibers 3 may be glass, carbon, boron, polymer such as aramid, metal or ceramic such as silicon carbide or aluminum oxide. The tow size or bundle size of the fibers is chosen to meet the flexibility requirements for the given application, i.e., a weaving or braiding process to form the end product. A smaller tow size is more easily woven. Accordingly, for complex shapes, tow sizes such as 3,000 fiber filaments per tow are preferred over larger tow sizes such as 6,000 or 12,000 fiber filaments per tow. Even smaller tow sizes may be preferred in cases where fiber diameters are larger with individual fibers which are correspondingly less compliant, for example, boron fibers having a typical diameter of 100 $\mu$m as compared to glass fibers having a typical diameter of only 16 $\mu$m. Useful fibers are known in the art, and many are commercially available.

The metal powder 4 use to impregnate the fibers 3 may be any metal or metal alloy, in particular aluminum, aluminum-lithium, titanium, magnesium or steel alloy, or mixtures thereof. Aluminum or titanium is preferred, with the former being the most preferred.

The specific combination of the fiber material and the metal powder must be chosen judiciously to avoid certain effects which are disadvantageous in the final product. For example, some combinations (e.g. carbon fibers and conductive metal powders such as aluminum or iron) may form galvanic calls, opening up the possibility for degradation of the resulting product even in the absence of external mechanical loading (tension, compression, flexure, etc.). Certain other combinations such as the use of glass fibers with alkaline metal powders are also not recommended as glass is known to be subject to alkaline attack, leading to degradation of the fibers. Selection of compatible materials is within the skill of the art.

Further, the fiber material chosen should be thermally capable of withstanding the processing temperature required for the melting of the metal powder when consolidating the composite material into the finished part. In most cases, the specific combination of metal powder and fiber materials should be chosen in such a manner that only metals which melt below the melting point or decomposition temperature of the fibers are employed.

The fiber volume of the metal matrix impregnated tow composite material prepared in accordance with the instant invention may range from 25 to 80%, preferably between 55 and 75%, and even more preferably between 60 and 70%. Depending on the particular application, higher or lower fiber volumes may be required.

The flexible jacket 2 which covers the roving of fibers 3 impregnated with the metal powder 4 is comprised of a thermoplastic material which decomposes during the ultimate processing of the woven or braided composite material into the finished consolidated part. The thermoplastic material has a melting point which is lower than that of the metal powder. Useful thermoplastic materials include polyamides, polycarbonates, polyethylene, polypropylene, polyvinyl chloride, polyester, polyvinylidene fluoride, polyphenylene sulfide, polyetherketone, polyimide, polyetherimide, polysulfone, and the like. Such thermoplastic resins are known in the art, and most are available commercially, for example, Avtel® (polyphenylene sulfide), from Phillips or Radel® and Udel® (polysulfones) from Amoco Corporation. Preferred thermoplastic materials are polyetherimide (such as Ultem® from General Electric), polycarbonate (such as Lexan® from General Electric), polyamide (such as Nylon® from DuPont or Durethan® from Bayer).

The first step in forming the weavable metal matrix impregnate tow composite in accordance with the instant invention involves impregnating a roving of fibers with the metal powder. Impregnation of the roving may be accomplished in a number of different ways, such as described in French patent application No. 8,103,528 or U.S. Pat. No. 4,614,678, the latter patent herein incorporated by reference. One particularly useful process is where the fiber roving is spread out as it passes through a fluidized bed of the metal powder, thereby impregnating the fiber roving with the metal particles. Electrostatic charges are created using known techniques (for example, by an electrostatic generator or friction brushes or rollers) to hold the metal particles in place within the fibers, which are then gathered together.

Thereafter, the fiber roving impregnated with the metal powder is extrusion coated or dip coated with a solution or dispersion containing the thermoplastic material to provide a continuous thermoplastic outer layer or jacket. The continuous outer layer serves the purpose of keeping the metal particles contained within the fiber bundle while still allowing the particles to intermingle within the outer layer. The thermoplastic jacket thus allows for easy handling of the composite part and easy forming into complex shapes. The coating process is described in U.S. Pat. No. 4,614,678, herein incorporated by reference.

As a practical limit, the thermoplastic jacket must be sufficiently thick to withstand processing and handling without leaking the metal powder. Useful thicknesses are directly related to the ease with which the particular thermoplastic material extrudes as well as the toughness of said material. Depending on the particular thermoplastic material, useful ranges may be between 0.1 and 10 mils, preferably between 0.25 and 5 mils, most preferably between 0.5 and 1 mil.

The composite materials produced in accordance with the instant invention may be woven, braided or knit into various desired structural shapes before final processing to consolidate the structure into a monolithic part. No other known technique for producing metal matrix composite materials results in such ease of processing.

The weavable metal matrix impregnated tow composite material of the instant invention finds utility in several applications, such as in the replacement of all-metal structural parts such as rocket nose cones, fuselage sections, car chassis, and the like, resulting in parts which are lighter and stronger. Additionally, because of the continuous reinforcement, processes such as pultrusion provide means for pultruding metal-matrix composites, which is not possible using state of the art technology. Moreover, processing methods such as filament winding, using a continuous consolidation technique (melting the metal locally as the material is wound) is possible with the composite materials of the instant invention.

The following examples are presented for the purpose of illustration only and are not to be construed as limiting the nature or scope of the instant invention in any manner whatsoever.

EXAMPLE 1

This example illustrates a typical weavable metal matrix impregnated tow composite material assembled in accordance with the instant invention. A flat, easy-to-handle woven broad good is formed from a metal matrix impregnated towpreg composite material which has been woven into the desired style and then laid-up. The lay-up is easily consolidated into a finished part by applying heat and pressure.

To accomplish the above, boron fibers are impregnated with powdered alloy aluminum (2024 or 6061) and jacketed within a sheath of 1 mil thick polyetherimide (Ultem® from General Electric). A lay-up is formed therefrom by assembling into the desired orientation. The lay-up is then placed under transverse pressure in the range of 4–5 kpsi (28–35 MPa) while heating to approximately 524° C. to consolidate into the finished part by diffusion welding.

EXAMPLE 2

A three-dimensional rocket nose cone is formed by knitting a metal matrix impregnated towpreg material prepared in accordance with the instant invention and subsequently heating and consolidating under pressure in an appropriate mold.

To achieve the above, boron fibers are impregnated with titanium alloy powder (Ti-3Al–2.5V and Ti-13V-10Mo-5Zr-2.5Al) and then jacketed within a sheath of 1 mil thick polycarbonate (Lexan® from General Electric). Processing takes place under vacuum between 427–982° C. for up to 240 hours.

EXAMPLE 3

A filament-wound structure is made in the conventional manner with the exception that the metal matrix impregnated towpreg is consolidated in place. Processing is carried out by means of a laser to apply heat locally to burn the thermoplastic sheath and melt the metal powder. Pressure is applied locally to consolidate the molten material. The filament-wound structure is used to form a fuselage section or rotor section and the like.

Boron fibers impregnated with aluminum alloy powder (6061) and coated with a 1–2 mil polyamide (Nylon) are consolidated in situ using a YAG laser.

EXAMPLE 4

A structure of constant cross-section is made using the pultrusion method wherein multiple tows of the metal matrix impregnated towpreg are drawn through a die which heats and consolidates the material as its passes through. The structure is used to form a box beam, tube and the like.

Titanium-alloy composites reinforced with silicon carbide (SiC) filaments with 40–50 volume percent of SiC fibers are impregnated with titanium alloy powder (Ti-6Al–4V) and then jacketed with polysulfone (Radel® from Amoco Corporation) before being pulled through a step-molding pultrusion machine.

While an embodiment of the invention has been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A weavable metal matrix impregnated tow composite material comprising a roving of reinforcing fibers impregnated with metal powder and jacketed with a sheath of a continuous layer of thermoplastic material, said weavable metal matrix impregnated tow capable of being consolidated into a fiber-reinforced composite material having a continuous metal matrix, devoid of thermoplastic sheath material.

2. A composite material according to claim 1, wherein the roving of fibers is comprised of glass fiber, polymer fiber, carbon fiber, boron fiber, metal fiber, ceramic fiber, or mixtures thereof.

3. A composite material according to claim 1, wherein the metal powder comprises aluminum, aluminum-lithium, titanium, magnesium, steel alloy, or mixtures thereof.

4. A composite material according to claim 3, wherein the metal powder comprises aluminum or titanium.

5. A composite material according to claim 4, wherein the metal powder comprises aluminum.

6. A composite material according to claim 1, wherein the thermoplastic material is selected from the group consisting of polyamide, polycarbonate, polyethylene, polypropylene, polyvinyl chloride, polyester, polyvinylidene fluoride, polyphenylene sulfide, polyetheretherketone, polyimide, polyetherimide, polysulfone, and mixtures thereof.

7. A composite material according to claim 6, wherein the thermoplastic material is a polyetherimide, polycarbonate or polyamide.

8. A composite material according to claim 1, wherein the thermoplastic material is applied to the metal powder impregnated roving of fibers by extrusion coating.

9. A composite material according to claim 1, wherein the continuous layer of thermoplastic material is of a thickness of between about 0.1 mil and about 10 mils.

10. A composite material according to claim 9, wherein the thickness is between about 0.25 mil and about 5 mils.

11. A composite material according to claim 10, wherein the thickness is between about 0.5 mil and about 1 mil.

12. A composite material according to claim 1 which has a fiber volume from about 25% to about 80% based on the volume enclosed within said thermoplastic sheath.

13. A composite material according to claim 12 which has a fiber volume of about 55% to about 75%.

14. A composite material according to claim 13 which has a fiber volume of about 60% and about 70%.

15. A weavable metal matrix impregnated tow composite material comprising a fusible metal powder; from 55 volume percent to about 70 volume percent of a reinforcing fiber roving, said reinforcing fiber having a melting point above the melting point of said metal powder, said reinforcing fiber roving and said metal powder encased within a sheath of a thermoplastic material which melts or decomposes at a temperature lower than the melting point of said fusible metal powder, wherein said volume percent is the percent by volume within said thermoplastic sheath, said weavable metal matrix impregnated tow capable of being consolidated into a fiber-reinforced composite material having a continuous metal matrix, devoid of thermoplastic sheath material.

16. The tow of claim 15 wherein said metal powder comprises aluminum or titanium.

17. The tow of claim 15 wherein said reinforcing fibers comprise boron fibers, carbon fibers, glass fibers, or ceramic fibers.

18. The tow of claim 16 wherein said reinforcing fibers comprise boron fibers, carbon fibers, glass fibers, or ceramic fibers.

* * * * *